United States Patent
Sa et al.

(10) Patent No.: US 10,382,665 B2
(45) Date of Patent: Aug. 13, 2019

(54) AUTO FOCUS METHOD AND ELECTRONIC DEVICE FOR PERFORMING THE SAME

(71) Applicant: Samsung Electronics Co., Ltd., Gyeonggi-do (KR)

(72) Inventors: Seok Woon Sa, Gyeonggi-do (KR); Byeong Chan Park, Gyeonggi-do (KR); In Koo Kang, Gyeonggi-do (KR); Seung Han Lee, Gyeonggi-do (KR); Kwang Tai Kim, Gyeonggi-do (KR); Dong Hyun Yeom, Gyeonggi-do (KR); Jong Hoon Won, Gyeonggi-do (KR); Ki Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 46 days.

(21) Appl. No.: 15/841,521

(22) Filed: Dec. 14, 2017

(65) Prior Publication Data

US 2018/0191947 A1    Jul. 5, 2018

(30) Foreign Application Priority Data

Dec. 30, 2016    (KR) .................. 10-2016-0183511

(51) Int. Cl.
| H04N 5/232 | (2006.01) |
| H04N 5/225 | (2006.01) |
| H04N 5/247 | (2006.01) |

(52) U.S. Cl.
CPC ....... *H04N 5/23212* (2013.01); *H04N 5/2258* (2013.01); *H04N 5/23267* (2013.01); *H04N 5/23293* (2013.01); *H04N 5/247* (2013.01)

(58) Field of Classification Search
CPC ............. H04N 5/2258; H04N 5/23212; H04N 5/23267; H04N 5/23293; H04N 5/247
See application file for complete search history.

(56) References Cited

U.S. PATENT DOCUMENTS

| 7,676,146 B2 | 3/2010 | Border et al. |
| 7,683,962 B2 | 3/2010 | Border et al. |

(Continued)

FOREIGN PATENT DOCUMENTS

| JP | 2003-298920 A | 10/2003 |
| JP | 4299561 B2 | 7/2009 |

(Continued)

OTHER PUBLICATIONS

US 8,957,975 B2, 02/2015, Venkataraman et al. (withdrawn)
European Search Report dated May 28, 2018, EP 17209056.5.

*Primary Examiner* — Lin Ye
*Assistant Examiner* — Chriss S Yoder, III
(74) *Attorney, Agent, or Firm* — Cha & Reiter, LLC.

(57) ABSTRACT

An electronic device is provided. The electronic device includes a first camera module including a first lens set, a second camera module including a second lens set, and a processor connected to the first camera module and a second camera module. The processor is configured to move the first lens focus on a subject, resulting in an auto focus (AF) value and an image obtained by the first camera module, evaluate reliability of the AF value, based on the reliability of the AF value, calculate a movement parameter of the second lens set, corresponding to a movement parameter of the first lens set, and move the second lens set depending on the calculated movement parameter.

20 Claims, 7 Drawing Sheets

(56) References Cited

U.S. PATENT DOCUMENTS

| | | |
|---|---|---|
| 7,859,588 B2 * | 12/2010 | Parulski ............... H04N 5/2258 348/349 |
| 8,134,637 B2 | 3/2012 | Rossbach et al. |
| 8,139,141 B2 | 3/2012 | Bamji et al. |
| 8,139,142 B2 | 3/2012 | Bamji et al. |
| 8,213,786 B2 | 7/2012 | Song |
| 8,289,377 B1 | 10/2012 | Tsai et al. |
| 8,294,780 B2 | 10/2012 | Chang |
| 8,456,517 B2 | 6/2013 | Spektor et al. |
| 8,514,491 B2 | 8/2013 | Duparre |
| 8,581,963 B2 | 11/2013 | Tsai et al. |
| 8,619,148 B1 | 12/2013 | Watts et al. |
| 8,718,459 B2 | 5/2014 | Hsu |
| 8,743,184 B2 | 6/2014 | Pan |
| 8,836,767 B2 | 9/2014 | Endo |
| 8,848,039 B2 | 9/2014 | Spektor et al. |
| 8,861,089 B2 | 10/2014 | Duparre |
| 8,866,920 B2 | 10/2014 | Venkataraman et al. |
| 8,885,059 B1 | 11/2014 | Venkataraman et al. |
| 8,896,719 B1 | 11/2014 | Venkataraman et al. |
| 8,902,321 B2 | 12/2014 | Venkataraman et al. |
| 8,903,233 B1 | 12/2014 | Huang et al. |
| 8,909,037 B1 | 12/2014 | Huang et al. |
| 8,922,695 B2 | 12/2014 | He et al. |
| 9,918,003 B2 | 3/2018 | Inoue |
| 2005/0285966 A1 | 12/2005 | Bamji et al. |
| 2006/0221250 A1 | 10/2006 | Rossbach et al. |
| 2008/0218612 A1 | 9/2008 | Border et al. |
| 2008/0219654 A1 * | 9/2008 | Border ............... H04N 5/23212 396/89 |
| 2010/0007717 A1 | 1/2010 | Spektor et al. |
| 2010/0165120 A1 | 7/2010 | Chang |
| 2011/0069189 A1 | 3/2011 | Venkataraman et al. |
| 2011/0080487 A1 | 4/2011 | Venkataraman et al. |
| 2011/0122308 A1 | 5/2011 | Duparre |
| 2011/0150446 A1 | 6/2011 | Song |
| 2011/0234768 A1 * | 9/2011 | Pan ................... G02B 7/38 348/47 |
| 2011/0285910 A1 | 11/2011 | Bamji et al. |
| 2012/0154647 A1 | 6/2012 | Endo |
| 2013/0053101 A1 | 2/2013 | Tsai et al. |
| 2013/0100311 A1 | 4/2013 | Ogasahara |
| 2013/0155309 A1 | 6/2013 | Hill et al. |
| 2013/0169760 A1 | 7/2013 | Watts |
| 2013/0169844 A1 | 7/2013 | Watts et al. |
| 2013/0241824 A1 | 9/2013 | Spektor et al. |
| 2013/0308197 A1 | 11/2013 | Duparre |
| 2013/0322862 A1 | 12/2013 | Hsu |
| 2014/0030705 A1 | 1/2014 | Deshpande et al. |
| 2014/0092275 A1 | 4/2014 | Morihisa |
| 2014/0098194 A1 | 4/2014 | Goma et al. |
| 2014/0192212 A1 | 7/2014 | He et al. |
| 2014/0307054 A1 | 10/2014 | Chang et al. |
| 2014/0327743 A1 | 11/2014 | Chou et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2015/0002724 A1 | 1/2015 | Chuang et al. |
| 2015/0009133 A1 | 1/2015 | Spektor et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0049172 A1 | 2/2015 | Ramachandra et al. |
| 2015/0092066 A1 * | 4/2015 | Geiss ................ H04N 5/2258 348/180 |
| 2016/0134802 A1 * | 5/2016 | Inoue ................ H04N 5/23212 348/349 |
| 2018/0160029 A1 | 6/2018 | Inoue |

FOREIGN PATENT DOCUMENTS

| | | |
|---|---|---|
| JP | 2012-133194 A | 7/2012 |
| JP | 2013-008004 A | 1/2013 |
| JP | 2014-048329 A | 3/2014 |
| JP | 2014-202771 A | 10/2014 |
| KR | 10-2011-0015208 A | 2/2011 |

* cited by examiner

AUTO FOCUS METHOD AND ELECTRONIC DEVICE FOR PERFORMING THE SAME

CLAIM OF PRIORITY

This application claims the benefit under 35 U.S.C. § 119(a) of a Korean patent application filed on Dec. 30, 2016 in the Korean Intellectual Property Office and assigned Serial number 10-2016-0183511, the entire disclosure of which is hereby incorporated by reference.

TECHNICAL FIELD

The present disclosure relates to an auto focus (AF) method of a camera and an electronic device for performing the same.

BACKGROUND

With the advancement of information technology (IT), a camera has evolved from a device that exposes a film reel to a digital memory-based camera. Recently, cameras have been included as part of a portable electronic device such as smartphones.

A camera may condense light incident from the outside using its lens and may convert the condensed light into an electric signal. The electric signal may configure image data, and may be stored in a memory or may be output on a display.

SUMMARY

Focusing in the mentioned camera may be important to obtain a high-quality image, for example, enhance sharpness of a subject.

An automatic focus (AF) function may be to move a lens included in a camera back and forth to focus on a subject (i.e., allow a subject to be on focus). Each of various electronic devices including the camera may include a display and may output an image received from the camera on the display in real time (a preview or a live view). Thus, due to frequent movement of a lens while the AF function is performed, a field of view (FoV) of an image output on the display may be frequently wobbled (a so-called wobbling phenomenon).

Aspects of the present disclosure are to address at least the above-mentioned problems and/or disadvantages and to provide at least the advantages described below. Accordingly, an aspect of the present disclosure is to provide an electronic device for providing a live view finder function through a main camera module and may perform AF through a sub-camera module. Accordingly, another aspect of the present disclosure is to provide an electronic device for obtaining data associated with AF from a sub-camera module and using the obtained data for an AF operation of a main camera module.

In accordance with an aspect of the present disclosure, an electronic device is provided. The electronic device includes a first camera module including a first lens set, a second camera module including a second lens set, and a processor connected to the first camera module and a second camera module. The processor is configured to move the first lens focus on a subject, resulting in an auto focus (AF) value and an image obtained by the first camera module, evaluate reliability of the AF value, based on the reliability of the AF value, calculate a movement parameter of the second lens set, corresponding to a movement parameter of the first lens set, and move the second lens set depending on the calculated movement parameter. In accordance with another aspect of the present disclosure, an electronic device is provided. The electronic device comprises a first camera module, a second camera module configured to capture an image with a deeper depth of field (DoF) than the first camera module, and a processor connected to the first camera module and the second camera module. The processor is configured to select any one of the first camera module or the second camera module based on a blur level of an image obtained from the first camera module or the second camera module, move a lens set of the selected camera module such that the lens set focuses on the subject, thereby resulting in obtaining an image from the selected camera module and an AF value of the image, calculate a movement parameter of a lens set included in a camera module which is not selected, corresponding to a movement parameter of a lens set included in the selected camera module, as a result of evaluating reliability of the AF value of the image obtained from the selected camera module, and move the lens set included in the camera module which is not selected, depending on the calculated movement parameter.

An electronic device according to various embodiments of the present disclosure may remove an image wobble in a main camera module which supports a live view and may enhance a speed of an AF function a user feels. In addition, a variety of effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
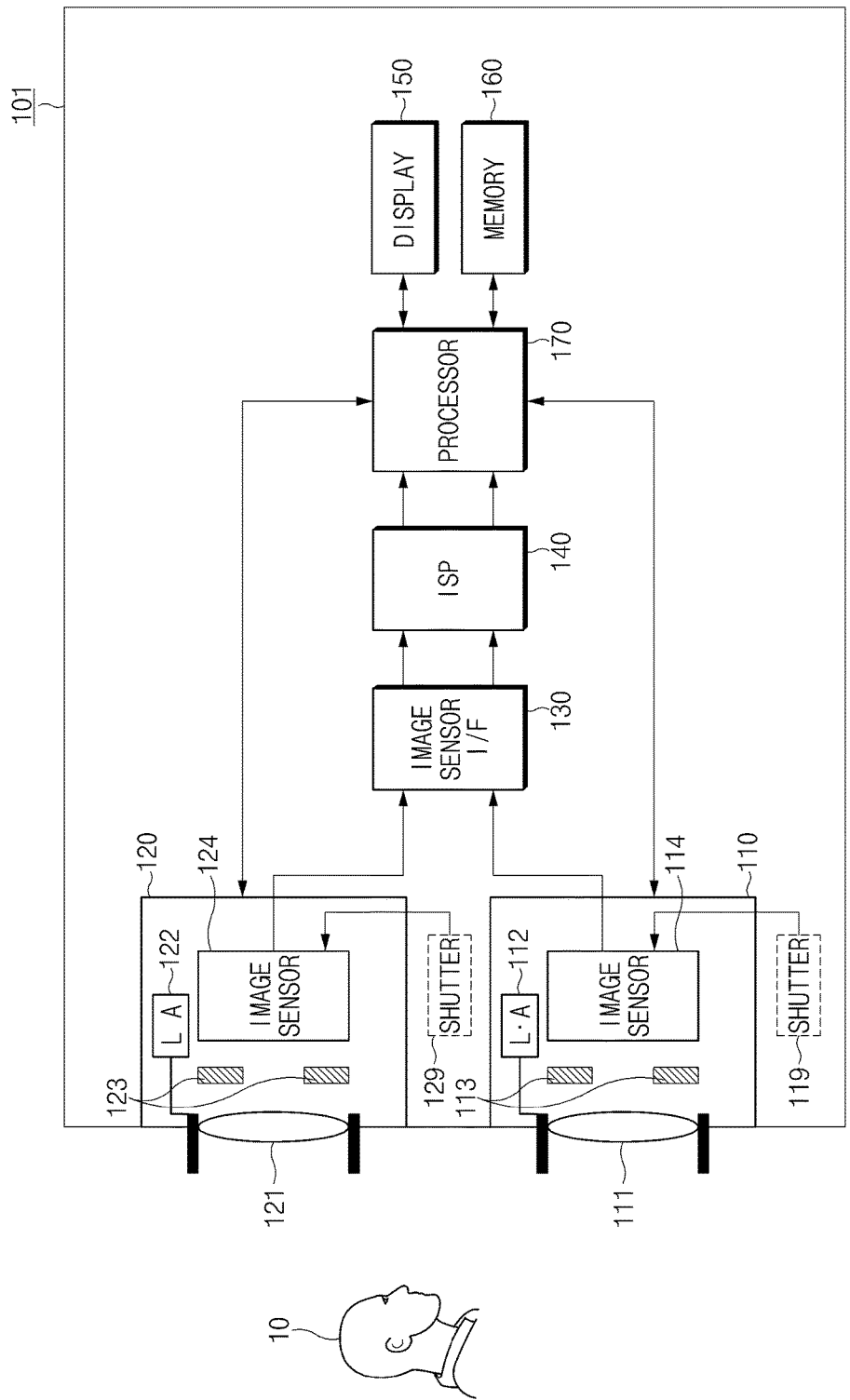
FIG. 1 is a block diagram illustrating a configuration of an electronic device according to an embodiment of the present disclosure.

Hereinafter, various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating a configuration of an electronic device according to an embodiment of the present disclosure.

Referring to FIG. 1, an electronic device 101 according to an embodiment may include a first camera module 110, a second camera module 120, an image sensor interface (I/F) 130, an image signal processor (ISP) 140, a display 150, a memory 160, and a processor 170. According to various embodiments, the electronic device 101 may be implemented not to include some of the elements or may be implemented to include an element which is not shown.

The first camera module 110 may include a first lens set 111, a first actuator 112, aperture walls 113 defining an aperture, and a first image sensor 114. The first camera module 110 may omit some of the elements or may be implemented to include additional elements (e.g., an optical image stabilization (OIS) module, a flash, or the like) not shown. According to some embodiments, the first camera module 110 may be referred to as a first optical system.

The first lens set 111 may condense light reflected from the outside to the first camera 110. The condensed light may arrive at a first image sensor 114 via the aperture formed from aperture walls 113. In other words, the first lens set 111 may allow light reflected or generated from a subject to reach a pixel array of the first image sensor 114.

The first actuator 112 may drive the first lens set 111 depending on control of the processor 170. The first actuator 112 may allow a subject 10 to be on focus by moving the first lens set 111. The first actuator 112 may include a servo motor or an ultrasonic motor. According to various embodiments, the first actuator 112 may be referred to as a lens actuator, an AF actuator, or the like.

The aperture walls 113 may adjust an amount of light which arrives at (or incident to) the first image sensor 114 by narrowing or widening the aperture formed therebetween. In general, as the aperture walls 113 are more widely opened, an amount of light which arrives at the first image sensor 114 increases (an effective aperture may be more increased). As the aperture walls 113 are more narrowly closed, an amount of light which arrives at the first image sensor 114 decreases (an effective aperture may be more decreased). According to an embodiment, the aperture walls 113 may defining an aperture having fixed width. In other words, the effective aperture may have a specified value by the fixed aperture.

The first image sensor 114 may include a pixel array in which a plurality of pixels are arranged as a two-dimensional (2D) grating shape. In certain embodiments, millions of pixels, even tens of millions of pixels, may be included in the pixel array. One of a plurality of reference colors may be assigned to each one of the plurality of pixels. For example, the plurality of reference colors may include "red, green, and blue (RGB)". The first image sensor 114 may be implemented using, for example, a charge-coupled device (CCD) or a complementary metal-oxide-semiconductor (CMOS).

According to an embodiment, the first image sensor 114 may generate an electric signal based on light received from the outside and may generate a digital image (e.g., a Bayer image) based on the electric signal. The image generated by the first image sensor 114 may be transmitted to the image sensor I/F 130.

A first shutter 119 may adjust, for example, a time when the first image sensor 114 is exposed to light, under control of the processor 170. For example, if the first shutter 119 is operated slowly, more light may be incident to the first image sensor 114. If the first shutter 119 is operated faster, less light may be incident to the first image sensor 114. A time when the shutter 119 is operated may be determined according to a shutter speed set automatically or manually. The first shutter 119 may include a mechanical shutter or an electronic shutter of a manner of controlling an image sensor.

The second camera module 120 may include the same or similar configuration to the first camera module 110. The second camera module 120 may include a second lens set 121, a second actuator 122 for driving the second lens set 121, a second aperture 123, a second image sensor 124, and a second shutter 129. A field of view (FoV) of the first camera 110 and an FoV of the second camera module 120 may be substantially the same as each other or may be within a constant range. The first camera 110 and the second camera module 120 may be exposed to the outside through a common surface of the electronic device 101 (e.g., a surface opposite to a surface where the display 150 is located).

In certain embodiment, the second camera module 120 operates similar to the first camera module 110. Herein, according to an embodiment, a specification of each element included in the second camera module 120 may different from a specification of each element included in the first camera module 110. For example, focal distances of the first lens set 111 and the second lens set 121, the number of pixels of the first image sensor 114 and the number of pixels of the second image sensor 124, each pixel pitch of the first image sensor 114 and each pixel pitch of the second image sensor 124, and the like may have different values.

The image sensor I/F 130 may serve as a medium for transmitting and receiving data between image sensor and another element (e.g., the ISP 140). For example, the image sensor I/F 130 may transmit image data generated by the first image sensor 114 or the second image sensor 124 to the ISP 140.

The ISP 140 may include a plurality of image processing (IP) functions. The ISP 140 may correct an image obtained from the first camera module 110 or the second camera module 120, through the plurality of IP functions. The plurality of IP functions may include various IP functions, such as an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, or an IP block for out-of-focus (or shallow depth of field (DoF)). The plurality of IP blocks may be referred to as an image processing filter, an image processing module, or the like. Further, according to various embodiments, the ISP 140 may be included in the processor 170.

The display 150 may visually output a variety of content (e.g., text, an image, a video, an icon, a widget, a symbol, or the like) to the user. For example, the display 150 may be configured to output an image received from the first camera module 110. If an image from the first camera module 110 is output on the display 150 in real time, an output of the image may be referred to as a so-called live view. According to an embodiment, the display 150 may include a touch pad. Thus, the display 150 may detect a touch, a gesture, proximity, or a hovering input using an electronic pen or part of a user's body.

The memory 160 may include a volatile and/or non-volatile memory. The memory 160 may store various instructions or data associated with the elements 110 to 150 and 170 included in the electronic device 101. For example, the memory 160 may store instructions to perform various operations described in the present disclosure. The instructions may be implemented as software, for example, an application program, an operating system (OS), or firmware, may be stored in the memory 160, and may be embedded in hardware.

The processor 170 may be electrically connected with the elements 110 to 160 included in the electronic device 101 and may perform an arithmetic operation about control and/or communication of the elements 110 to 160 included in the electronic device 101.

According to an embodiment, the processor 170 may control the first camera module 110 to perform AF on the subject 10 in response to a specified event. In this case, an image obtained through the second camera module 120 (or the second image sensor 124 of the second camera module 120) may be output on the display 150 in real time.

The specified event may be an event for triggering AF and may include, for example, a selection (e.g., a touch) of a user for an object of the subject 10 displayed on the display 150, a change in scene, or the like. The change in scene may be determined from, for example, a change in brightness of a specified level or more of an image received from the first camera module 110 or the second camera module 120, a movement/change of the recognized subject 10, a change in sensitivity of a specified level or more, or the like.

According to an embodiment, the processor 170 may move the first lens set 111 to focus on a subject, using AF value obtained by the first camera module 110. The processor 170 may move the first lens set 111 by controlling the first actuator 112. For example, in performing AF at the first camera module 110, the processor 170 may use a contrast AF scheme or a phase difference AF scheme. Thus, the AF value may correspond to a contrast value or a phase difference value obtained from the first camera module 111.

According to an embodiment, the processor 170 may evaluate reliability of the AF value of an image obtained by the first camera module 110. The processor 170 may determine whether to move the second lens set 121 included in the second camera module 120, based on the reliability.

The reliability of the AF value may be determined by various elements. According to various embodiments, the processor 170 may evaluate reliability based on a level of a noise included in an AF value, brightness of an image, a contrast ratio of the image, a blur level of the image, the number of saturated pixels included in the image, a degree of a flicker phenomenon of the AF value, or two or more combinations thereof.

For example, the processor 170 may evaluate whether reliability is high or low, depending on a level of a noise included in an AF value. In general, a noise may be included in an AF value. If an AF value is small, an error may occur upon focus detection. For example, if an AF/noise value is higher than a specified threshold, the processor 170 may determine that reliability is high. If the AF/noise value is lower than the specified threshold, the processor 170 may determine that the reliability is low.

For example, the processor 170 may evaluate whether reliability is high or low, depending on brightness of an obtained image. In general, since there is a high probability that a focus detection error will occur due to an increase in noise in a low illumination situation (a dark area), reliability may be low. Thus, for example, if brightness is higher than a specified threshold, the processor 170 may determine that reliability is high. If the brightness is higher than the specified threshold, the processor 170 may determine that the reliability is low.

For example, the processor 170 may evaluate whether reliability is high or low, based on a contrast ratio of an image. In general, since there is a high probability that a focus detection error will occur if a contrast ratio between the subject 10 and a background is low, reliability may be low. For example, if a contrast ratio is higher than a specified threshold, the processor 170 may determine that reliability is high. If the contrast ratio is lower than the specified threshold, the processor 170 may determine that the reliability is low.

For example, the processor 170 may evaluate whether reliability is high or low, based on a blur level (or a defocus amount, a bokeh size, or the like) of an obtained image. In general, if the blur level is high, it may difficult to detect focus. Thus, if the blur level is lower than a specific threshold, the processor 170 may determine that reliability is high. If the blur level is higher than the specific threshold, the processor 170 may determine that the reliability is low. The blur level may be calculated by a ratio of a high-frequency filter component of an AF value to a low-frequency filter component of the AF value.

For example, the processor 170 may evaluate whether reliability is high or low, depending on the number of saturated pixels included in an obtained image. For example, if a bright subject such as a point light source is captured, since there is a high probability that a focus detection error will occur, reliability may be low. The number of the saturated pixels included in the image may be ascertained through, for example, saturated pixel information which may be obtained by the ISP 140. If the number of saturated pixels is lower than a specified number, the processor 170 may determine that reliability is high. If the number of the saturated pixels is higher than the specified number, the processor 170 may determine that the reliability is low.

For example, the processor 170 may evaluate whether reliability is high or low, depending on a degree of a flick phenomenon of an AF value. The flicker phenomenon may be a phenomenon in which an AF value wobbles. Since there is a higher probability that a focus detection error will occur as the flicker phenomenon is more intensified, reliability may be low. The degree of the flicker phenomenon may be determined through a wobble of an AF value or a period when the AF value wobbles. If the degree of the flicker phenomenon is lower than a specified level, the processor 170 may determine that reliability is high. If the degree of the flicker phenomenon is higher than the specified level, the processor 170 may determine that the reliability is low.

Each of the examples of evaluating the reliability is described independently. However, embodiments are not limited thereto. According to various embodiments, the processor 170 may evaluate reliability in complex consideration of two or more elements. For example, in certain embodiments, the evaluation of the reliability can be the result of the sum of weighted values of the above factors. Further, the evaluating of reliability of an AF value may be performed in various methods other than the above-mentioned examples. For example, the processor 170 may evaluate reliability based on a repeated pattern of a high-frequency component of an image.

According to an embodiment, the processor 170 may calculate a movement parameter of the second lens set 121, corresponding to a movement parameter of the first lens set 111, by using the movement parameter of the first lens set 111 which is performing AF as a result of evaluating the above-mentioned reliability of the AF value. According to various embodiments, if there is a specification difference between an optical system of the first camera module 110 and an optical system of the second camera module 120, the processor 170 may convert a movement parameter of the second lens set 121, corresponding to a movement parameter of the first lens set 111, in consideration of a design specification difference or calibration data.

Meanwhile, the term "movement parameter" may include just the movement direction to a target location where the first and second lens sets 111 and 121 should be moved, such that the subject 10 is on focus, may include the movement direction to the target location and an estimated target range, or may include the movement direction to the target location as well as an amount of movement to the target location. For example, the movement direction of the first and second lens sets 111 and 121 may be any one of a front direction (a direction approached to the subject 10) or a rear direction (a direction distant from the subject 10). The amount of movement may be represented as a discrete step of a guide mechanism configured to move the first and second lens sets 111 and 121 to the target location. The target range may be a discrete step range estimated that the target location belongs.

According to an embodiment, if reliability of an AF value is evaluated to be higher than a first threshold, the processor 170 may calculate a direction facing a target location to cause the first lens to focus on the subject and an amount of movement to the target location. Further, the processor 170 may calculate a movement direction of the second lens set 121 and an amount of movement of the second lens set 121, respectively corresponding to a movement direction of the first lens set 111 and an amount of movement of the first lens set 111.

Since reliability of an AF value is evaluated to be relatively high, the processor 170 may relatively accurately calculate a direction and an amount of movement, in which the first lens set 111 is moved to a target location. Thus, a movement direction and an amount of movement for allowing the second lens set 121 to be on focus may be relatively accurately calculated. The processor 170 may move the second lens set 121 based on the calculated movement direction and the calculated amount of movement. Thus, a location of the second lens set 121 may be adjusted such that the subject 10 is on focus in the second camera module 120.

According to an embodiment, if reliability of an AF value is evaluated to be higher than a second threshold and be lower than a first threshold (the first threshold>the second threshold), the processor 170 may calculate a direction facing a target location where the first lens set 111 focuses on the subject and a target range estimated that the target location belongs. Further, the processor 170 may calculate a movement direction and a target range of the second lens set 121, corresponding to a movement direction and a target range of the first lens set 111.

In other words, if reliability of an AF value is evaluated as a middle degree, the processor 170 may relatively excellently calculate a direction in which the first lens set 111 of the first camera module 110 which is performing AF is moved. However, a target location where the first lens set 111 purportedly focuses on the subject may be not be accurate with a high degree of confidence. Instead, the processor 170 may set a target range estimated that the target belongs. The processor 170 may calculate a movement direction and a target range of the second lens set 121, corresponding to a movement direction and a target range of the first lens set 111.

Thus, for example, first of all, the processor 170 may move the second lens set 121 in the calculated movement direction, that is, a direction close to the target range. The processor 170 may evaluate reliability of an AF value again using the first camera module 110 on a periodic or aperiodic basis while the second lens set 121 is moved in a direction close to the target range. According to an embodiment, if the second lens set 121 enters a target range corresponding to a target range of the first lens set 111, that is, the calculated target range, the processor 170 may evaluate reliability of an AF value again using the first camera module 110.

In general, since reliability of an AF value increases as the first lens set 111 is closer to a target range, the reliability of an AF value may increases to be higher than the first threshold upon re-evaluation. As such, a location of the second lens set 121 may be adjusted to focus on the subject 10 in the second camera module 120.

According to an embodiment, if reliability of an AF value is evaluated to be lower than a second threshold, the processor 170 may calculate only a direction facing a target location where the first lens set 111 is on focus.

Since reliability of an AF value is evaluated to be relatively low, the processor 170 may move the first lens set 111 in the calculated direction and may evaluate reliability of an AF value again using the first camera module 110 on a periodic or aperiodic basis while moving the first lens set 111. Thus, according to various embodiments, the second lens set 121 of the second camera module 120 may maintain a previous location until reliability of an AF value from the first camera module 110 increases to the second threshold or more.

Further, according to various embodiments, reliability of an AF value may be evaluated to be very low. In this case, since it is impossible for the processor 170 to even calculate a direction facing a target location where the first lens set 111 focuses on the subject, it may evaluate reliability of an AF value on a periodic or aperiodic basis while moving the first lens set 111 in any direction. Thus, in this case, the second lens set 121 of the second camera module 120 may maintain a previous location until reliability of an AF value from the first camera module 110 increases to the second threshold or more.

Meanwhile, according to an embodiment, only if a difference between a current location $P_{L2\_current}$ of the second lens set 121 and a location $P_{L2\_calculated}$ indicated by a movement parameter of the second lens set 121, calculated based on a movement parameter of the first lens set 111, departs from a specified threshold range Th, the processor 170 may move the second set 121. This may be represented as a formula using Equation 1.

$$|P_{L2\_current} - P_{L2\_calculated}| > Th \qquad \text{[Equation 1]}$$

The threshold range Th may be set in various manners based on, for example, an acceptable depth of field (DoF) of the second camera 120 including the second lens set 121. The acceptable DoF may be determined based on a pixel pitch of the second image sensor 124 included in the second camera module 120, an F-number of the second camera module 120, lens sensitivity of the second lens set 121, and/or the like.

For example, in an image obtained by the first camera module 110 and the second camera module 120, the subject 10 which is on focus may be stopped, but only light around the subject 10 may be bright. Since the subject 10 is stopped, the second lens set 121 (used to actually capture an image) may fail to need to be moved.

However, as the light around the subject 10 is bright, the processor 170 may recognize a change in brightness of the light around the subject 10 as a change in scene. In this case, the processor 170 may move the first lens set 111 such that the subject 10 is on focus and may calculate a movement parameter of the second lens set 121, corresponding to a movement parameter of the first lens set 111.

According to an embodiment of the present disclosure, as shown in Equation 1, if a difference between a location indicated by a movement parameter of the second lens set 121 and a current location of the second lens set 121 is within a specified threshold range, the second lens set 121 may fail to need to be moved. Thus, if a live view is implemented using the second camera module 120 including the second lens set 121, although light around the subject 10 which is previously on focus is rapidly changed, that is, although a change in scene is recognized, a wobbling phenomenon may fail to be generated.

For another example, the subject 10 which is on focus may be moved left and right with respect to the direction of an optical axis of the first camera module 110. Alternatively, another subject may temporarily pass between the subject 10 and the electronic device 101. In this case, since there is no change really in a distance between the subject 10 and the electronic device 101, the second lens set 121 may fail to need to be moved.

However, the processor 170 of the electronic device 101 may recognize the above case as a change in scene. In this case, the processor 170 may move the first lens set 111 such that the subject 10 is on focus and may calculate a movement parameter of the second lens 121, corresponding to a movement parameter of the first lens set 111.

According to an embodiment of the present disclosure, as shown in Equation 1, if a difference between a location indicated by a movement parameter of the second lens set 121 and a current location of the second lens set 121 is within a specified threshold range, the second lens set 121 may fail to need to be moved. Thus, although the subject 10 which is previously on focus is moved left and right with respect to a direction of an optical axis or although another subject is temporarily brushed, the wobbling phenomenon may fail to be generated.

Figure 2:
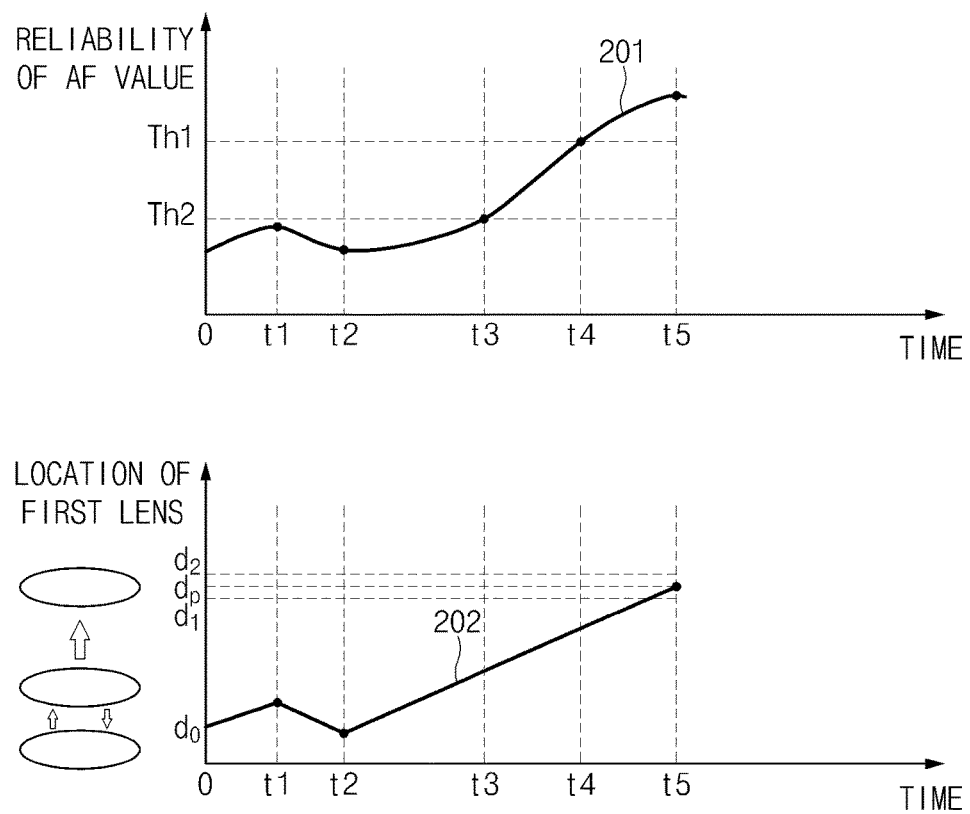
FIG. 2 is a drawing illustrating auto focus (AF) in a first camera module (or a sub-camera module) according to an embodiment of the present disclosure.

FIG. 2 is a graph of the AF in a first camera according to an embodiment of the present disclosure.

Referring to FIG. 2, graph 201 indicating the reliability of the AF value as a function of time and graph 202 indicating the location of the first lens set 111 included in a first camera module 110 (a sub camera module) as a function of time are shown.

An AF value may vary according to an AF scheme. For example, if AF is performed in a contrast AF scheme, the AF value may correspond to a contrast value of an image obtained by the first camera module 110. For another example, if AF is performed in a phase difference AF scheme, the AF value may correspond to a phase difference value obtained by the first camera module 110. In general, as an AF value is higher, reliability of the AF value may increase and on the lens set may focus on the subject 10 with a greater degree of confidence.

Reliability of an AF value of an image obtained from the first camera module 110 at an initial time 0 may be evaluated to be very low (see graph 201). Thus, since it is impossible for a processor 170 of FIG. 1 to even calculate a direction facing a target location $d_p$ where the first lens set 111 is on focus, as shown in graph 202, it may evaluate reliability of an AF value again on a periodic or aperiodic basis while moving the first lens set 111 in any direction.

For example, the processor 170 may move the first lens set 111, which is in an initial location do during a time between 0 to t1, in a first direction (e.g., a direction approached to the subject 10) and may move the first lens set 111 in a second direction (e.g., a direction distant from the subject 10) during a time between t1 and t2 by controlling a first actuator 112 of the first camera module 110. Referring to graph 201, according to movement of the first lens set 111, an AF value may be increased during a time between 0 and t1 and may be decreased during a time between t1 and t2.

According to various embodiments, the processor 170 may determine a direction for moving the first lens set 111 to the target location $d_p$ as the first direction by evaluating reliability of an AF value again on a periodic or aperiodic basis during the time between 0 to t2. According to another embodiment, the processor 170 may verify an increase and decrease in the AF value and may move the first lens set 111 in a direction in which an AF value is increased. For example, since an AF value is increased during the time between 0 and t1 and is decreased during the time between t1 and t2, the processor 170 may determine a direction for moving to the target location $d_p$ where the first lens set 111 is on focus as the first direction.

As shown in graph 202, the processor 170 may move the first lens set 111 in the determined first direction during a time between t2 and t3 by controlling a first actuator 112 of the first camera module 110. The processor 170 may evaluate reliability of an AF value on a periodic or aperiodic basis during the time between t2 and t3.

According to an embodiment, as shown in graph 201, the processor 170 may evaluate reliability of an AF value at a time between t3 and t4 to be higher than a second threshold Th2 and be lower than a first threshold Th1. Thus, the processor 170 may calculate a direction (e.g., the first direction) facing the target location $d_p$ where the first lens set 111 is on focus and a target range (e.g., a range between $d_1$ and $d_2$ shown in graph 202) estimated that the target location $d_p$ belongs. Further, the processor 170 may calculate a movement direction (e.g., the first direction) and a target range (e.g., a range between $D_1$ and $D_2$, see graph 301 of FIG. 3) of the second lens set 121, corresponding to a movement direction (e.g., the first direction) and the target range (e.g., the range between $d_1$ and $d_2$ shown in graph 202) of the first lens set 111.

According to an embodiment, the processor 170 may evaluate reliability of an AF value at a time between t4 and t5 to be higher than the first threshold Th1. Thus, the processor 170 may calculate an amount of movement for moving to the target location $d_p$ as well as a direction (e.g., the first direction) facing the target location $d_p$ where the first lens set 111 focuses on the subject. The processor 170 may move the first lens set 111 based on the calculated movement direction and the calculated amount of movement.

Figure 3:
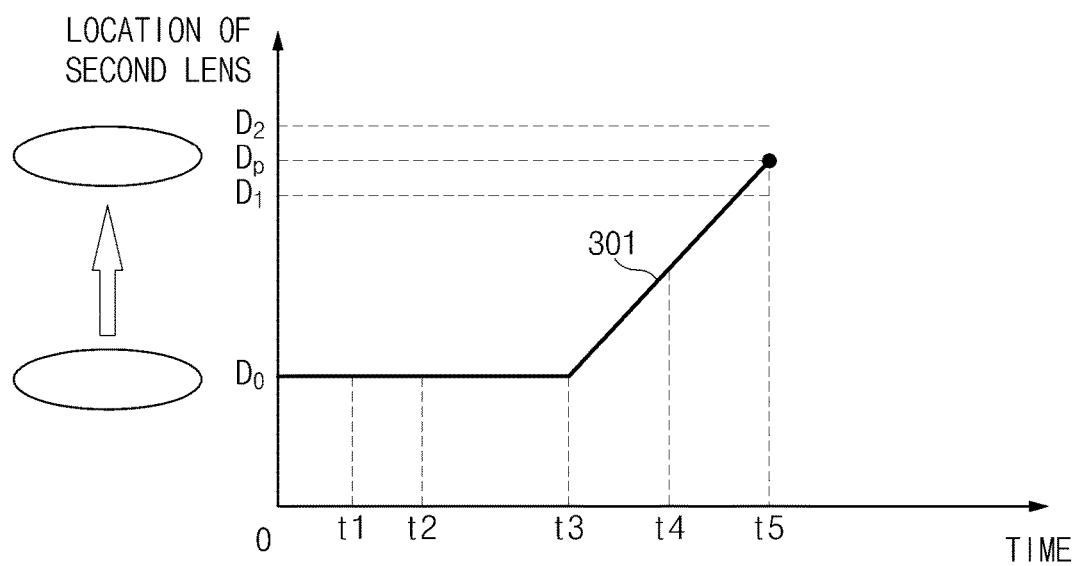
FIG. 3 is a drawing illustrating AF in a second camera module (or a main camera module) according to an embodiment of the present disclosure.

FIG. 3 is a drawing illustrating AF in a second camera according to an embodiment.

Referring to FIG. 3, graph 301 indicating a change in a location of a second lens set 121 included in a second camera module 120 (a main camera module) of FIG. 1 is shown, as a function of time.

Referring to graph 301, the second lens set 121 which is in an initial location $D_0$ may maintain a previous location during a time between 0 and t3. As shown in graph 201 of FIG. 2, this is because the reliability of the AF value of an image obtained from a first camera module 110 of FIG. 1 during a time between 0 and t3 is evaluated to be less than or equal to a second threshold value Th2.

In graph 301, the second lens set 121 may face a target range (a range between $D_1$ and $D_2$) during a time between t3 and t4 to move in a first direction. As shown in graph 201 of FIG. 2, this is because the reliability of the AF value of an image obtained from the first camera module 110 during a time between t3 and t4 is evaluated to be higher than a second threshold Th2 and be lower than a first threshold Th1. Since the processor 170 calculates a target range of the second lens set 121 as a range between $D_1$ and $D_2$ during the time between t3 and t4, the processor may fail to determine a target location $D_p$ while moving towards the first direction during the time between t3 and t4.

In graph 301, the second lens set 121 may continue moving to the target location $D_p$ in the first direction during a time between t4 and t5. As shown in graph 201 of FIG. 2, this is because the reliability of the AF value of an image obtained from the first camera module 110 during a time between t4 and t5 is evaluated to be higher than the first threshold Th1 and because the target location $D_p$ of the second lens set 121, corresponding to a target location $d_p$ of a first lens set 111, is calculated.

As seen in graph 301, for example, if an image obtained from the second camera module 120 is displayed as a live view on a display 150 of FIG. 1, an image wobble by movement of the second lens set 121 may fail to be generated. This is because a movement direction of the second lens set 121 is kept continuous in the first direction.

As shown in graphs 201 and 202 of FIG. 2 and graph 301 of FIG. 3, the second lens set 121 of the second camera module 120 may fail to move in an interval between t1 and t2 when reliability of an AF value of the first camera module 110 falls or an interval between 0 and t3 when the reliability of the AF value of the first camera 110 is lower than the second threshold Th2. In other words, if the reliability of the AF value of the first camera module 110 falls in the interval between t1 and t2 or if the reliability of the AF value is lower than the second threshold Th2 in the interval between 0 and t3 although the reliability of the AF value rises, the second lens set 121 may fail to move although the first lens set 111 of the first camera module 110 moves in the interval between t1 and t2 or between 0 and t3.

As such, as a result of evaluating the reliability of the AF value of the first camera module 110, the second lens set 121 may fail to move until at least a movement direction of the second lens set 121 is determined. When the reliability of the AF value rises to be higher than the second threshold Th2 (when a movement direction of the second lens set 121 is determined), movement may be started.

According to various embodiments, a time when the second lens set 121 is started to move is not limited to the above-mentioned example. For example, when reliability of an AF value of the first camera module 110 rises to be higher than the first threshold Th1 (time t4 in FIGS. 2 and 3), that is, when both of a movement direction of the second lens set 121 and an amount of movement of the second lens set 121 are determined (when a target location is determined), the processor 170 may start to move the second lens set 121.

According to the above description, the first camera module 110 may be used for AF (i.e., as a sub-camera), and the second camera module 120 may be used for image capture or a live view (i.e., as a main camera). However, according to an embodiment of the present disclosure, a role each of the first camera module 110 and the second camera module 120 plays may change. In certain embodiments, the role each of the first camera module 110 and the second camera module 120 plays may be dynamically determined, and may even swap.

According to an embodiment, the processor 170 may respectively obtain a first image and a second image from the first camera module 110 and the second camera module 120 and may determine a role each of the first camera module 110 and the second camera module 120 plays, based on a blur level (or a defocus amount, a bokeh size, or the like) or a blur level of the second image.

According to an embodiment, if the blur level is higher than a specified level, the processor 170 may select a camera module which may capture an image, a DoF of which is deep, between the first and second camera modules 110 and 120, as a sub-camera for AF. In contrast, if the blur level is lower than the specified level, the processor 170 may select a camera module which may capture an image, a DoF of which is shallow, between the first and second camera modules 110 and 120, as a sub-camera for AF. Meanwhile, the selected camera may be specified as a sub-camera for AF. A camera which is not selected may be specified as a main camera used for image capture or a live view.

As such, if the main camera and the sub-camera are specified, the electronic device 101 may perform AF according to various embodiments of the present disclosure described with reference to FIGS. 2 and 3. For example, a camera module which may obtain an image with a deep DoF may be a camera module with a high F-number, and a camera module which may obtain an image with a shallow DoF may be a camera module with a low F-number.

Figure 4:
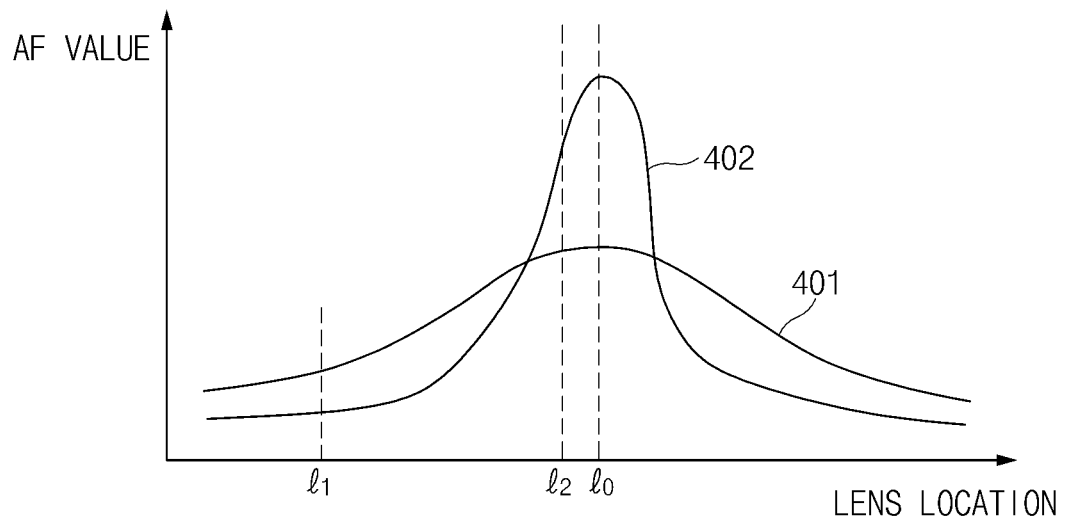
FIG. 4 is a drawing illustrating a selection of a camera module according to an embodiment of the present disclosure.

FIG. 4 is a graph illustrating a selection of a camera module according to an embodiment.

Referring to FIG. 4, graph 401, indicating an AF value according to a lens location, of a camera module which may obtain an image with a deep DoF and graph 402, indicating an AF value according to a lens location, of a camera module which may obtain an image with a shallow DoF are shown. The AF value may vary according to an AF scheme. For example, if AF is performed in a contrast AF scheme, the AF value may correspond to a contrast value. For another example, if AF is performed in a phase difference AF scheme, the AF value may correspond to a phase difference value. In general, as the AF value is higher, a subject may be more accurately on focus.

Referring to graphs 401 and 402, if a lens location of each of the first and second camera modules 110 and 120 is $l_1$, an AF value of each of the first and second camera modules 110 and 120 may detected to be low, and reliability of a lens location (a so-called peak location) to focus on the subject may also be low. Since the lens location $l_1$ is distant from a lens location $l_0$ (the so-called peak location) when an AF value indicates a maximum value (when on focus), a blur level may be detected to be high, and an AF value and reliability of the AF value may be detected to be low.

Comparing graph 401 with graph 402 near the lens location $l_1$, a change range of an AF value according to a lens location is higher in graph 401. Thus, as verified in graph 401, when a blur level is high, a direction of lens movement for AF may be more accurately determined if using a camera module which may obtain an image with a deep DoF. In this respect, if a blur level is high, it may be preferable that a camera module, which may obtain an image with a deep DoF, is used as a sub-camera module.

Meanwhile, if a lens location of each of the first and second camera modules 110 and 120 is $l_2$, an AF value of each of the first and second camera modules 110 and 120 may detected to be relatively high, and reliability of a lens location (the so-called peak location) to focus on the subject may also be high. Since the lens location $l_2$ is close to the lens location $l_0$ (the so-called peak location) when an AF value indicates a maximum value (when on focus), a blur level may be detected to be low, and an AF value and reliability of the AF value may be detected to be high.

Comparing graph 401 with graph 402 near the lens location $l_2$, a change range of an AF value according to a lens location is higher in graph 402. Thus, as verified in graph 402, when a blur level is low, a direction of lens movement for AF may be more accurately determined if using a camera module which may obtain an image with a shallow DoF. In this respect, if a blur level is low, it may be preferable that a camera module, which may obtain an image with a shallow DoF, is used as a sub-camera module.

Further, an acceptable DoF (a focus allowable error) of the camera module (corresponding to graph 402) which may obtain the image with the shallow DoF may be less than an acceptable DoF of the camera module (corresponding to graph 401) which may obtain the image with the deep DoF. Thus, a result value about lens movement in graph 402 may be used in lens movement in graph 401, whereas it is difficult to use a result value about lens movement in graph 401 in lens movement in graph 402. This is because blurring which departs from an error range occurs since an AF acceptable DoF (or an allowable error) is exceeded, if the result value about lens movement in graph 401 is used in lens movement in graph 402.

Figure 5:
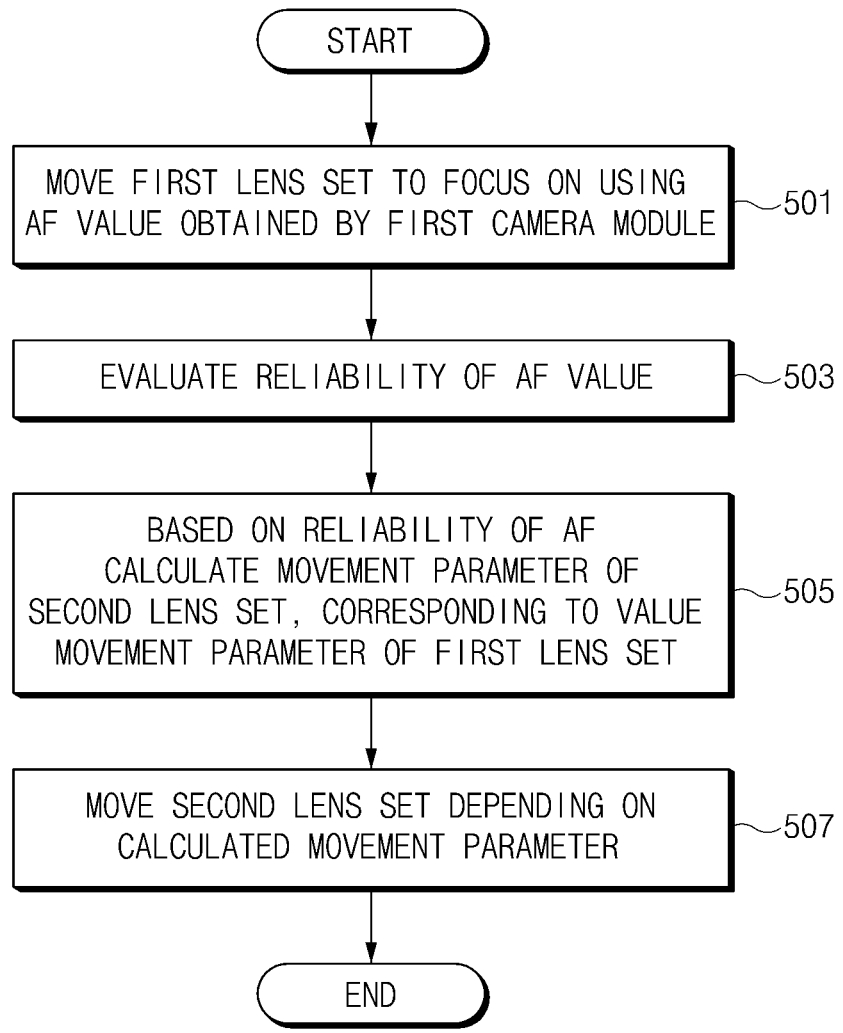
FIG. 5 is a flowchart illustrating an AF method according to an embodiment of the present disclosure.

FIG. 5 is a flowchart illustrating an AF method according to an embodiment.

Referring to FIG. 5, the AF method according to an embodiment may include operations 501 to 507. Operations 501 to 507 may be performed by, for example, an electronic device 101 shown in FIG. 1. Each of operations 501 to 507 may be implemented with, for example, instructions performable (or executable) by a processor 170 of the electronic device 101. The instructions may be stored in, for example, a computer storage medium or a memory 160 of the electronic device 101 shown in FIG. 1. Hereinafter, reference numerals of FIG. 1 may be used for describing operations 501 to 507. While operations 501 to 507 are performed, an image obtained from a second camera module 120 may be output on a display 150 in real time.

In operation 501, the processor 170 of the electronic device 101 may move a first lens set 111 to focus on a subject 10, using an AF value obtained by the first camera module 110. Operation 501 may be performed in response to, for example, occurrence of a specified event for triggering an AF operation. The specified event may include, for example, a selection of a user for an object of the subject 10 displayed on the display 150, a change in scene, or the like.

In operation 503, the processor 170 may evaluate reliability of the AF value of the image obtained from the first camera module 110. The AF value may vary according to an AF scheme in operation 501. For example, if AF is performed in a contrast AF scheme in operation 501, the AF value may correspond to a contrast value of an image obtained by the first camera module 110. For another example, if AF is performed in a phase difference AF scheme in operation 501, the AF value may correspond to a phase difference value obtained by the first camera module 110.

According to an embodiment, the reliability of the AF value may be determined by various elements. According to various embodiments, the processor 170 may evaluate reliability based on a level of a noise included in an AF value, brightness of an image, a contrast ratio of the image, a blur level of the image, the number of saturated pixels included in the image, a degree of a flicker phenomenon of the AF value, or two or more combinations thereof.

In operation 505, based on the reliability of the AF, the processor 170 may calculate a movement parameter of a second lens set 121, corresponding to a movement parameter of the first lens set 111, by using the movement parameter of the first lens set 111 included in the first camera module 110 which is performing AF in operation 501. The movement parameter may vary as a result of evaluating the reliability in operation 503 (a description will be given in detail with reference to FIG. 6).

In operation 507, the processor 170 may move the second lens set 121 based on the movement parameter of the second lens set 121, calculated in operation 505.

Figure 6:
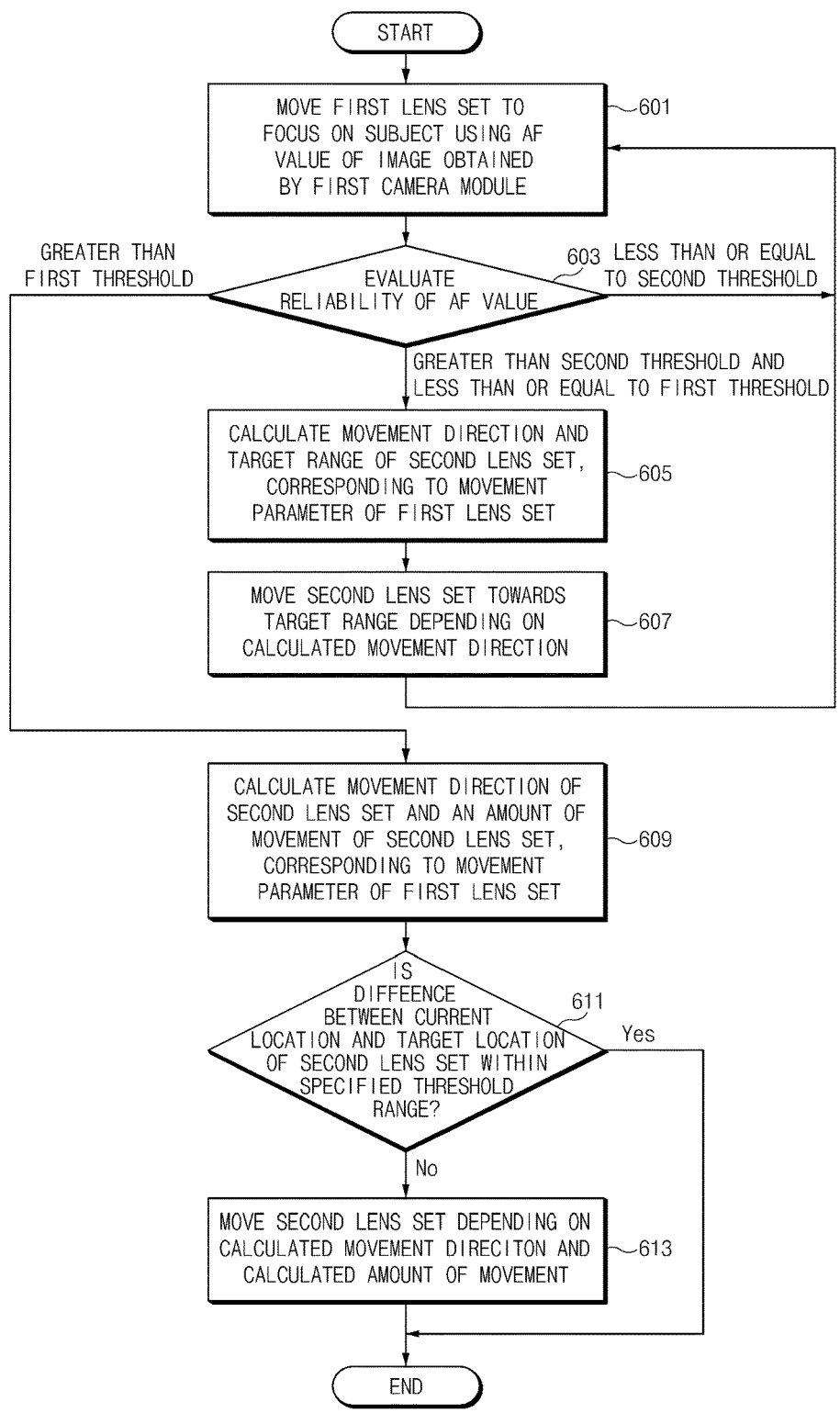
FIG. 6 is a flowchart illustrating an AF method according to another embodiment of the present disclosure.

FIG. 6 is a flowchart illustrating an AF method according to another embodiment.

Referring to FIG. 6, the AF method according to an embodiment may include operations 601 to 613. Reference numerals of FIG. 1 may be used for describing operations 601 to 613. A partial description duplicated by a description with reference to FIG. 5 may be omitted. Further, an image obtained from a second camera module 120 while operations 601 to 613 are performed may be output on a display 150 like FIG. 5.

In operation 601, a processor 170 of an electronic device 101 may move a first lens set 111 to focus on a subject 10 using an AF value obtained by the first camera module 110. Operation 601 may be performed in response to, for example, occurrence of a specified event for triggering an AF operation (e.g., a selection of an object for the subject 10, a change in scene, or the like).

In operation 603, the processor 170 may evaluate reliability of the AV value of the image obtained from the first camera module 110. The processor 170 may return to operation 601, may proceed to operation 605, or may proceed to operation 609, based on the result of evaluating the reliability of the AF value.

According to an embodiment, if the reliability of the AF value is less than or equal to a second threshold in operation 603 in operation 603, a movement parameter of a first lens set 111 included in the first camera module 110 which is performing an AF operation in operation 601 may include a movement direction to a target location where the first lens set 111 is on focus or any direction. If the reliability of the AF value is less than or equal to the second threshold, it may difficult for the processor 170 to calculate a movement parameter of a second lens set 121 included in a second camera module 120 using just a movement direction of the first lens set 111. Thus, the processor 170 may return to operation 601 to perform an AF operation according to operation 601 again and may evaluate reliability of an AF value again in operation 603.

According to an embodiment, if the reliability of the AF value is greater than the second threshold and is less than or equal to the first threshold in operation 603, a movement parameter of the first lens set 111 may include a movement direction to a target location where the first lens set 111 is on focus and a target range including the target location. The processor 170 may proceed to operation 605.

According to an embodiment, if the reliability of the AF value is greater than the first threshold in operation 603, a movement parameter of the first lens set 111 may include a direction to a target location where the first lens set 111 is on focus and an amount of movement to the target location. The processor 170 may proceed to operation 609.

In operation 605, since the processor 170 evaluates that the reliability of the AF value is greater than the second threshold and is less than or equal to the first threshold, it may calculate a movement parameter of the second lens set 121, corresponding to the movement parameter of the first lens set 111. The calculated movement parameter of the second lens set 121 may include a movement direction of the second lens set 121, corresponding to the movement direction of the first lens set 111, and a target range of the second lens set 121, corresponding to the target range of the first lens set 111.

In operation 607, the processor 170 may move the second lens set 121 towards the movement direction of the second lens set 121, calculated in operation 605, that is, the target range of the second lens set 121, calculated in operation 605.

According to an embodiment, if the movement of the second lens set 121 is started, the processor 170 may return to operation 601 to perform an AF operation in the first camera module 110 according to operation 601 and may evaluate reliability of an AF value again on a periodic or aperiodic basis in operation 603. For example, if the second lens set 121 enters the target range of the second lens set 121, calculated in operation 605, the processor 170 may evaluate reliability of the AF value again. The evaluating again of the reliability of the AF value may be repeated until the reliability is greater than the first threshold.

In operation 609, since the processor 170 evaluates that the first threshold of the reliability of the AF value is greater than the first threshold, it may calculate a movement parameter of the second lens set 121, corresponding to the movement parameter of the first lens set 111. The calculated movement parameter of the second lens set 121 may include a movement direction of the second lens set 121, corresponding to the movement direction of the first lens set 111 and an amount of movement to a target location of the second lens set 121, corresponding to the target location of the first lens set 111.

In operation 611, the processor 170 may determine whether a difference between a current location of the second lens set 121 and the target location of the second lens set 121 is within a specified threshold range. According to an embodiment, the threshold range may be set based on an acceptable DoF of the second camera module 120. If the difference is within the specified threshold range, the processor 170 may end the process. If the difference is out of the specified threshold range, the processor 170 may proceed to operation 613.

In operation 613, the processor 170 may move the second lens set 121 to the target location based on the movement direction of the second lens set 121 and the amount of movement of the second lens set 121, calculated in operation 609.

Figure 7:
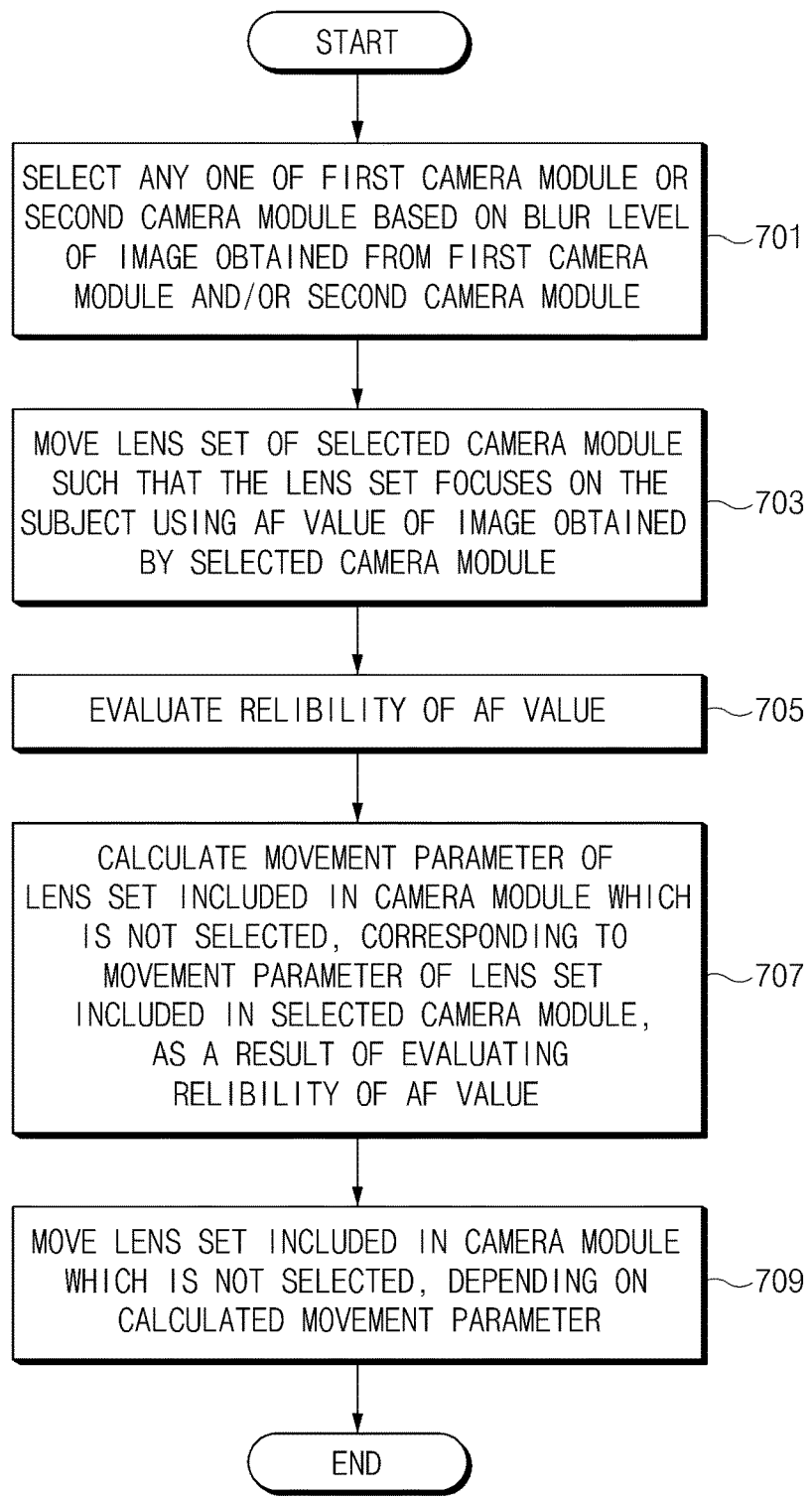
FIG. 7 is a flowchart illustrating a selection and AF method of a camera to perform AF according to an embodiment of the present disclosure.

FIG. 7 is a flowchart illustrating a selection and AF method of a camera to perform AF according to an embodiment.

Referring to FIG. 7, the selection and AF method of the camera to perform the AF according to an embodiment may include operations 701 to 709. Reference numerals of FIG. 1 may be used for describing operations 701 to 709. A partial description duplicated by a description of FIG. 5 may be omitted.

In operation 701, a processor 170 of an electronic device 101 may select any one of a first camera module 110 or a second camera module 120 based on a blur level of an image obtained from the first camera module 110 and/or the second camera module 120.

According to an embodiment, if the blur level is higher than a specified level, the processor 170 may select a camera module which may capture an image with a deeper DoF, for example, a camera module with a higher F-number, between the first and second camera modules 110 and 120. On the other hand, if the blur level is lower than the specified level, the processor 170 may select a camera module which may capture an image with a shallower DoF, for example, a camera module with a lower F-number, between the first and second camera modules 110 and 120.

The selected camera module may be selected as a sub-camera module used for an AF operation. A camera module which is not selected may be a main camera module which provides a live view on a display 160 while operations 701 to 709 are performed. Thus, the selected camera module may function as the first camera module 110 described with reference to FIG. 6, and the camera module which is not selected may function as the second camera module 120.

In operations 703 to 709, the processor 170 may perform the same operations as operations 501 to 507 shown in FIG. 5. Operations 703 to 709 are outlined hereafter.

In operation 703, the processor 170 may move a lens set of the camera module (hereinafter referred to as "sub-camera module") selected in operation 701 such that the lens set focuses on the subject, using an AF value obtained by the selected camera module.

In operation 705, the processor 170 may evaluate reliability of the AF value of the image obtained from the sub-camera module.

In operation 707, the processor 170 may calculate a movement parameter of a lens set included in the camera module which is not selected (hereinafter referred to as "main camera module"), corresponding to a movement parameter of a lens set included in the sub-camera module, by using the movement parameter of the lens set as a result of evaluating the reliability of the AF value.

In operation 709, the processor 170 may move the lens set of the main camera module depending on the movement parameter calculated in operation 707.

According to various embodiments of the present disclosure, a camera module which is most suitable for AF may be selected as a sub-camera module, and the camera module may be used for an AF operation. Further, since movement of a lens set included in the main camera module is determined based on reliability of an AF value in the sub-camera module, wobbling in the main camera module may be removed and an AF speed a user feels may be enhanced.

As described above, an electronic device according to an embodiment of the disclosure may include a first camera module including a first lens set, a second camera module including a second lens set, and a processor connected to the first camera module and a second camera module. The processor is configured to move the first lens focus on a subject, resulting in an auto focus (AF) value and an move the first lens set to focus on a subject, using an auto focus (AF) value obtained by the first camera module, evaluate reliability of the AF value, based on the reliability of the AF value, calculate a movement parameter of the second lens set, corresponding to a movement parameter of the first lens set, and move the second lens set depending on the calculated movement parameter.

According to an embodiment, when the reliability is higher than a first threshold, the movement parameter of the first lens set comprises a movement direction to a target location that causes the first lens to focus on the subject and an amount of movement to the target location. Move the second lens set depending on the calculated movement parameter comprises move the second lens set by another movement direction and another amount of movement respectively corresponding to the movement direction of the first lens set and the amount of movement of the first lens set.

According to an embodiment, when the reliability is higher than a second threshold and lower than a first threshold, the movement parameter of the first lens set consists of a movement direction to a target location that causes the first lens to focus on the subject and a target range including the target location, and wherein the first threshold is higher than the second threshold According to an embodiment, the processor may move the second lens set in a direction corresponding to the movement direction of the first lens set and may re-evaluate the reliability periodically or aperiodically. For example, when the second lens set enters a range corresponding to the target range of the first lens set, the processor is configured to re-evaluate the reliability.

According to an embodiment, when the reliability is evaluated to be lower than a second threshold lower than a first threshold, the movement parameter of the first lens set may include a direction to a target location where the first lens set is on focus.

According to an embodiment, the processor may be configured to evaluate the reliability based on a level of a noise included in the AF value, brightness of the image, a contrast ratio of the image, a blur level of the image, the number of saturated pixels included in the image, or a degree of a flicker phenomenon of the AF value.

According to an embodiment, when a difference between a current location of the second lens set and a location indicated by the calculated movement parameter departs from a specified threshold range, the processor may move the second lens set depending on the calculated movement parameter.

According to an embodiment, the threshold range may be set based on an acceptable depth of field (DoF) of the second camera module. The acceptable DoF may be determined based on at least one of, for example, a pixel pitch of a pixel included in the second camera module, an F-number of the second camera module, or lens sensitivity of the second lens set.

According to an embodiment, the electronic device may further include a display configured to output an image received from the second camera module.

According to an embodiment, the processor may control the first camera module such that the first lens set focuses on the subject, depending on a contrast AF scheme or a phase difference AF scheme.

According to an embodiment, the processor may calculate a location parameter of the second lens set by converting a location parameter of the first lens set.

According to an embodiment, if calculating a location parameter of the second lens set, the processor may reflect a difference between a specification of an optical system of the first camera module and a specification of an optical system of the second camera module.

According to an embodiment, the first camera module may have at least part of a field of view (FoV), which is in common with an FoV of the second camera module.

An electronic device according to another embodiment may include a first camera module, a second camera module configured to capture an image with a deeper depth of field (DoF) than the first camera module, and a processor connected to the first camera module and the second camera module. The processor may be configured to select any one of the first camera module or the second camera module based on a blur level of an image obtained by the first camera module or the second camera module, move a lens set of the selected camera module such that the lens set focuses on the subject, using an AF value obtained by the selected camera module, calculate a movement parameter of a lens set included in a camera module which is not selected, corresponding to a movement parameter of a lens set included in the selected camera module, as a result of evaluating reliability of the AF value of the image obtained from the selected camera module, and move a lens set included in the camera module which is not selected, depending on the calculated movement parameter.

According to an embodiment, if the blur level is higher than a specified level, the processor may select the second camera module.

According to an embodiment, if the blur level is lower than the specified level, the processor may select the first camera module.

According to an embodiment, the second camera module may correspond to a camera module with a high F-number.

According to an embodiment, the processor may control the selected camera module such that the subject is on focus, depending on a contrast AF scheme or a phase difference AF scheme.

According to an embodiment, the processor may be configured to evaluate the reliability based on a level of a noise included in the AF value, brightness of the image, a contrast ratio of the image, a blur level of the image, the number of saturated pixels included in the image, or a degree of a flicker phenomenon of the AF value.

According to an embodiment, the first camera module and the second camera module may be exposed to the outside through a common surface of the electronic device.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 170), may cause the one or more processors to perform a function corresponding to the instruction. The computer-readable storage media, for example, may be the memory 160.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
 a first camera module including a first lens set;
 a second camera module including a second lens set; and
 a processor connected to the first camera module and a second camera module,
 wherein the processor is configured to:
 move the first lens set to focus on a subject using an auto focus (AF) value obtained by the first camera module;
 evaluate reliability of the AF value;
 based on the reliability of the AF value, calculate a movement parameter of the second lens set, corresponding to a movement parameter of the first lens set; and
 move the second lens set depending on the calculated movement parameter.

2. The electronic device of claim 1, wherein, when the reliability is higher than a first threshold, the movement parameter of the first lens set comprises a movement direction to a target location that causes the first lens to focus on the subject and an amount of movement to the target location, and
 wherein move the second lens set depending on the calculated movement parameter comprises:
 move the second lens set by another movement direction and another amount of movement respectively corresponding to the movement direction of the first lens set and the amount of movement of the first lens set.

3. The electronic device of claim 1, wherein, when the reliability is higher than a second threshold and lower than a first threshold, the movement parameter of the first lens set consists of a movement direction to a target location that causes the first lens to focus on the subject and a target range including the target location, and
 wherein the first threshold is higher than the second threshold.

4. The electronic device of claim 3, wherein the processor is configured to:
 move the second lens set in a direction corresponding to the movement direction of the first lens set; and
 re-evaluate the reliability periodically or aperiodically.

5. The electronic device of claim 3, wherein the processor is configured to move the second lens set in a direction corresponding to the movement direction of the first lens set, and
 wherein, the processor is configured to re-evaluate the reliability when the second lens set enters a range corresponding to the target range of the first lens set.

6. The electronic device of claim 1, wherein, when the reliability is evaluated to be lower than a second threshold lower than a first threshold, the movement parameter of the first lens set comprises a direction to a target location where the first lens set is on focus.

7. The electronic device of claim 1, wherein evaluate the reliability value of the AF comprises:
evaluate the reliability based on a level of a noise included in the AF value, brightness of the image, a contrast ratio of the image, a blur level of the image, the number of saturated pixels included in the image, a degree of a flicker phenomenon of the AF value, or two or more combinations thereof.

8. The electronic device of claim 1, wherein, when a difference between a current location of the second lens set and a location indicated by the calculated movement parameter departs from a specified threshold range, the processor is configured to move the second lens set depending on the calculated movement parameter.

9. The electronic device of claim 8, wherein the threshold range is set based on an acceptable depth of field (DoF) of the second camera module.

10. The electronic device of claim 1, further comprising:
 a display configured to output an image received from the second camera module.

11. The electronic device of claim 1, wherein the processor is configured to;
 control the first camera module such that the first lens set focuses on the subject depending on a contrast AF scheme or a phase difference AF scheme.

12. The electronic device of claim 1, wherein the processor is configured to:
 calculate a location parameter of the second lens set by converting a location parameter of the first lens set.

13. The electronic device of claim 1, wherein the first camera module has at least part of a field of view (FoV), which is in common with an FoV of the second camera module.

14. An electronic device, comprising:
 a first camera module;
 a second camera module configured to capture an image with a deeper depth of field (DoF) than the first camera module; and
 a processor connected to the first camera module and the second camera module,
 wherein the processor is configured to:
 select any one of the first camera module or the second camera module based on a blur level of an image obtained by the first camera module or the second camera module;
 move a lens set of the selected camera module such that the lens set focuses on the subject using an AF value obtained by the selected camera module;
 calculate a movement parameter of a lens set included in a camera module which is not selected, corresponding to a movement parameter of a lens set included in the selected camera module, as a result of evaluating reliability of the AF value of the image obtained from the selected camera module; and
 move the lens set included in the camera module which is not selected, depending on the calculated movement parameter.

15. The electronic device of claim 14, wherein, if the blur level is higher than a specified level, the processor selects the second camera module.

16. The electronic device of claim 14, wherein, if the blur level is lower than a specified level, the processor selects the first camera module.

17. The electronic device of claim 14, wherein the second camera module corresponds to a camera module with a high F-number.

18. The electronic device of claim 14, wherein the processor is configured to:

control the selected camera module such that the subject is on focus, depending on a contrast AF scheme or a phase difference AF scheme.

19. The electronic device of claim 14, wherein the processor is configured to:

evaluate the reliability based on a level of a noise included in the AF value, brightness of the image, a contrast ratio of the image, a blur level of the image, the number of saturated pixels included in the image, a degree of a flicker phenomenon of the AF value, or two or more combinations thereof.

20. The electronic device of claim 14, wherein the first camera module and the second camera module are exposed to the outside through a common surface of the electronic device.

* * * * *